United States Patent
Chang (10) Patent No.: US 9,137,293 B2
(45) Date of Patent: Sep. 15, 2015

(54) METHOD OF TRANSFERRING A FILE VIA A NETWORK AND FILE TRANSFERRING SYSTEM THEREOF

(75) Inventor: Yung-Yen Chang, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 1237 days.

(21) Appl. No.: 12/712,195

(22) Filed: Feb. 25, 2010

(65) Prior Publication Data

US 2011/0099221 A1    Apr. 28, 2011

(30) Foreign Application Priority Data

Oct. 22, 2009  (TW) ................................ 98135755 A (51) Int. Cl.
*G06F 15/16* (2006.01)
*H04L 29/08* (2006.01)
(52) U.S. Cl.
CPC ..................................... H04L 67/06 (2013.01)
(58) Field of Classification Search
CPC ......................................................... H04L 67/06
USPC ................................................... 709/236, 237
See application file for complete search history.

(56) References Cited

U.S. PATENT DOCUMENTS

| 6,205,498 | B1 | 3/2001 | Habusha |
| 7,526,552 | B2* | 4/2009 | Gomez et al. ................. 709/226 |
| 7,720,063 | B2* | 5/2010 | Maiorana et al. ............. 370/389 |
| 2003/0081599 | A1 | 5/2003 | Wu |
| 2007/0091894 | A1 | 4/2007 | Kang |
| 2008/0045263 | A1 | 2/2008 | Speight |
| 2008/0285581 | A1* | 11/2008 | Maiorana et al. ............. 370/415 |
| 2010/0217889 | A1* | 8/2010 | Simcoe et al. ................ 709/237 |
| 2011/0131654 | A1* | 6/2011 | Taneja et al. .................... 726/23 |
| 2012/0143993 | A1* | 6/2012 | Russo et al. .................. 709/219 |

FOREIGN PATENT DOCUMENTS

| CN | 101146259 A | 3/2008 |
| EP | 1 384 356 B1 | 4/2006 |
| TW | 589837 | 6/2004 |

OTHER PUBLICATIONS

Office action mailed on Aug. 13, 2012 for the Taiwan application No. 098135755, p. 2 line 2-26, p. 3-4, p. 5 line 1-15.

(Continued)

*Primary Examiner* — Douglas Blair
(74) *Attorney, Agent, or Firm* — Winston Hsu; Scott Margo (57) ABSTRACT

A method of transferring a file via a network includes following steps: transmitting a read request packet from a client to a server, the read request packet having multiple-packets-transmission information, wherein the multiple-packets-transmission information is labeled with an amount index, and transmitting a plurality of data packets corresponding to the file from the server to the client continuously according to an amount index of the multiple-packets-transmission information after the server receives the read request packet. The client receives the plurality of data packets from the server without replying any acknowledgement packet to the server within the continuous transmission of the plurality of data packets.

18 Claims, 5 Drawing Sheets

(56) References Cited

OTHER PUBLICATIONS

Arsahd Hussain et al., "A Simple Cross-layer Approach to Reduce Duplicate Acknowledgements for TCP over WLAN", 2008 IEEE, May 1-3, 2005, pp. 63-66.

Office action mailed on Dec. 3, 2012 for the China application No. 200910210173.5, p. 3 line 2-45, p. 4 line 1-4, line 6-12, line 15-22, line 25-35 and line 38-45, p. 5 line 1-5, line 8-15, line 18-22 and line 25-45, p. 6 line 1-36 and line 38-44, p. 7 line 2-9, line 12-21, line 24-36 and line 39-45, p. 8 line 1 and line 4-8 and p. 9.

\* cited by examiner

| Opcode field | Block field | Amount field |
|---|---|---|

FIG. 5

METHOD OF TRANSFERRING A FILE VIA A NETWORK AND FILE TRANSFERRING SYSTEM THEREOF

BACKGROUND OF THE INVENTION

1. Field of the Invention

The present invention relates to a method of transferring a file via a network and a file transferring system thereof, and more particularly, to a method without any acknowledgement packet transmission as transferring a plurality of data packets via a network for decreasing an amount of the data transmission and a file transferring system thereof.

2. Description of the Prior Art

Generally, there are many methods of accessing a file from a remote end via a network, such as file transfer protocol (FTP), peer-to-peer (P2P), area network of Microsoft operating system, E-mail, and so on. For example, trivial file transfer protocol (TFTP) is a simple protocol of the FTP, which utilizes user datagram protocol (UDP) to transfer and receive data, so that two computers connected to the network can transfer the file to each other.

Due to the advanced multimedia technology, many kinds of files including traditional documents and multimedia files are transferred via the network. However, it takes a long time to transfer the multimedia files with large size and even decreases bandwidth of the network transmission. For example, in conventional TFTP transmission, as a client downloads a file from a server, the client transfers an initial read request packet to the server so as to acknowledge whether the file exists. Afterward, the server replies an initial acknowledgement packet to the client to acknowledge whether the file exists. Then, the server transfers data packets corresponding to the file to the client continuously. Each data packet has size limitation, such as 16K bytes. Therefore, the file is divided into a plurality of data packets for being transferred to the client. After the client receives each data packet, the client has to respectively reply the acknowledgement packet corresponding to the data packet to the server so as to acknowledge accuracy of the data packet. That is to say, after the server transfers the Nth data packet to the client, the client replies the Nth acknowledgement packet to the server. And after the server receives the Nth acknowledgement packet, the server transfers the next (N+1)th data packet to the client continuously. And then the client replies the (N+1)th acknowledgement packet to the server. As there are M data packets which the server transfers to the client, there are M acknowledgement packets which the client replies to the server accordingly. The conventional acknowledging procedure increases an amount of data transmission. Thus, design of a method of transferring the file with greater transmission efficiency for decreasing the amount of data transmission is an important issue in the network technology.

SUMMARY OF THE INVENTION

The present invention provides a method of transferring multiple data packets via a network and a file transferring system thereof for solving above drawbacks.

According to the claimed invention, a method of transferring a file via a network includes transmitting a read request packet from a client to a server, the read request having multiple-packets-transmission information, wherein the multiple-packets-transmission information is labeled with an amount index, and transmitting a plurality of data packets corresponding to the file from the server to the client continuously according to the amount index of the multiple-packets-transmission information after the server receives the read request packet. The client receives the plurality of data packets from the server without replying any acknowledgement packet to the server within the continuous transmission of the plurality of data packets.

According to the claimed invention, the method further includes transmitting an initial read request packet from the client to the server so as to request the server to transmit the file to the client.

According to the claimed invention, the method further includes replying an initial acknowledgement packet by the server to the client to acknowledge whether the file exists after the server receives the initial read request packet.

According to the claimed invention, the multiple-packets-transmission information further includes a size index that dictates a size of a single data packet, and the server transmits the plurality of data packets with a corresponding space to the client continuously according to the size index of the single data packet.

According to the claimed invention, the method further includes transmitting a acknowledgement packet from the client to the server to acknowledge whether the plurality of data packets is transmitted correctly and to provide amount information of the data packets of next transmission from the server after transmitting the plurality of data packets corresponding to the file from the server to the client continuously.

According to the claimed invention, the method further includes transmitting the acknowledgement packet from the client waiting a predetermined period to the server after transmitting the plurality of data packets corresponding to the file from the server to the client continuously.

According to the claimed invention, the predetermined period is generated according a product of a period for decoding a data stream from the single data packet and the amount of the plurality of data packets.

According to the claimed invention, the method further includes transmitting the acknowledgement packet from the client to the server so as to provide the amount information of the data packets of the next transmission from the server includes providing the amount information of the data packets of next transmission from the server according to flag values of data streams decoded from the plurality of data packets.

According to the claimed invention, providing the amount information of the data packets of next transmission from the server according to the flag values of the data streams decoded from the plurality of data packets includes providing the amount information of the data packets of next transmission from the server according to a flag value of the last data stream decoded from the plurality of data packets.

According to the claimed invention, the method further includes transmitting a corresponding amount of the plurality of data packets from the server to the client continuously according to the amount information of the data packets of the next transmission from the server after the server receives the acknowledgement packet.

According to the claimed invention, a file transmission system includes a client. The client includes a first network transmission unit for transmitting a read request packet and receiving data packets, the read request packet has multiple-packets-transmission information, wherein the multiple-packets-transmission information is labeled with an amount index, a memory buffer for storing the data packets received by the first network transmission unit temporarily, a first control unit coupled to the first network transmission unit and the memory buffer for decoding the data packets stored in the memory buffer into corresponding data streams, and a first memory unit coupled to the first control unit for storing the data streams decoded by the first control unit. The file transmission system further includes a server for transmitting a file to the client. The server includes a second network transmission unit for receiving the read request packet transmitted from the first network transmission unit and for transmitting data packets to the first network transmission unit, a second memory unit for storing the file, and a second control unit for controlling the second network transmission unit to transmit a plurality of data packets corresponding to the file to the first network transmission unit continuously according to the amount index of the multiple-packets-transmission information of the read request packet received by the second network transmission unit. The client receives the plurality of data packets from the server without replying any acknowledgement packet to the server within the continuous transmission of the plurality of data packets.

According to the claimed invention, the first network transmission unit is further for transmitting an initial read request packet to the second network transmission unit so as to request the server to transmit the file to the client.

According to the claimed invention, the second control unit controls the second network transmission unit to reply an initial acknowledgement packet to the first network transmission unit to acknowledge whether the file exists after the second network transmission unit receives the initial read request packet.

According to the claimed invention, the multiple-packets-transmission information further includes a size index that dictates a size of a single data packet, and the second control unit is for controlling the second network transmission unit to transmit the plurality of data packets with a corresponding space to the client continuously according to the size index of the single data packet.

According to the claimed invention, the first network transmission unit transmits a acknowledgement packet to the second network transmission unit to acknowledge whether the plurality of data packets is transmitted correctly and to provide amount information of the data packets of next transmission from the server after the second network transmission unit transmits the plurality of data packets corresponding to the file to the client continuously.

According to the claimed invention, the first network transmission unit transmits the acknowledgement packet to the second network transmission unit later than a predetermined period after the second network transmission unit transmits the plurality of data packets corresponding to the file to the client continuously.

According to the claimed invention, the predetermined period is generated according a product of a period for decoding the data stream from the single data packet and an amount of the plurality of data packets.

According to the claimed invention, the acknowledgement packet provides the amount information of the data packets of the next transmission from the server according to flag values of the data streams decoded from the plurality of data packets.

According to the claimed invention, the acknowledgement packet provides the amount information of the data packets of the next transmission from the server according to the flag value of the last data stream decoded from the plurality of data packets.

According to the claimed invention, the second control unit controls the second network transmission unit to transmit a corresponding amount of the plurality of data packets to the first network transmission unit continuously according to the amount information of the data packets of the next transmission from the server after the second network transmission unit receives the acknowledgement packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
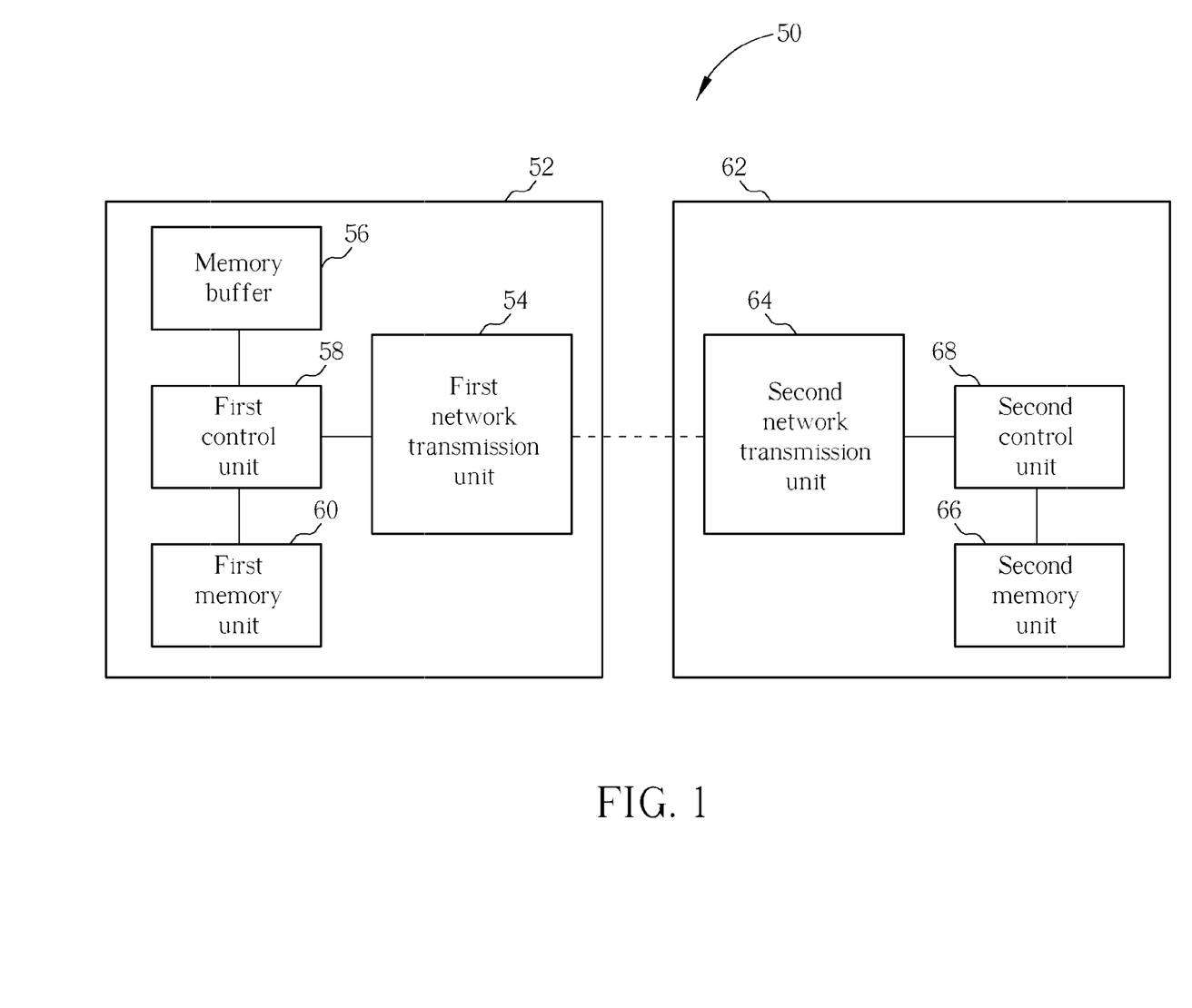
FIG. 1 is a functional block diagram of a file transmission system of transferring a file via a network according to a preferred embodiment of the present invention.

Please refer to FIG. 1. FIG. 1 is a functional block diagram of a file transmission system 50 for transferring a file via a network according to a preferred embodiment of the present invention. For example, the file transmission system 50 can transfer the file via file transfer protocol (FTP) or trivial file transfer protocol (TFTP). The file transmission system 50 includes a client 52, which can be a personal computer device. The client 52 includes a first network transmission unit 54 for transmitting a read request packet and data packets via the network. The client 52 further includes a memory buffer 56 for storing the data packets received by the first network transmission unit 54 temporarily. The memory buffer 56 can be an access region of a random access memory (RAM). The client 52 further includes a first control unit 58 coupled to the first network transmission unit 54 and the memory buffer 56 for decoding the data packets stored in the memory buffer 56 into corresponding data streams. The first control unit 58 can be hardware, software, or firmware. The client 52 further includes a first memory unit 60 coupled to the first control unit 58 for storing the data streams decoded by the first control unit 58. The first memory unit 60 can be a storage device, such as a hard disc. The file transmission system 50 further includes a server 62 for transmitting the file to the client 52. The server 62 can be a server host. The server 62 includes a second network transmission unit 64 for receiving the read request packet transmitted from the first network transmission unit 54 of the client 52 and for transmitting the data packets to the first network transmission unit 54 via the network. The server 62 further includes a second memory unit 66 for storing the file to be transferred to the client 52. The second memory unit 66 can be a storage device, such as a hard disc. The server 62 further includes a second control unit 68 for controlling the second network transmission unit 64 to transmit a plurality of data packets corresponding to the file to the first network transmission unit 54 of the client 52 continuously according to the read request packet received by the second network transmission unit 64. The second control unit 68 can be the hardware, the software, or the firmware.

Figure 2:
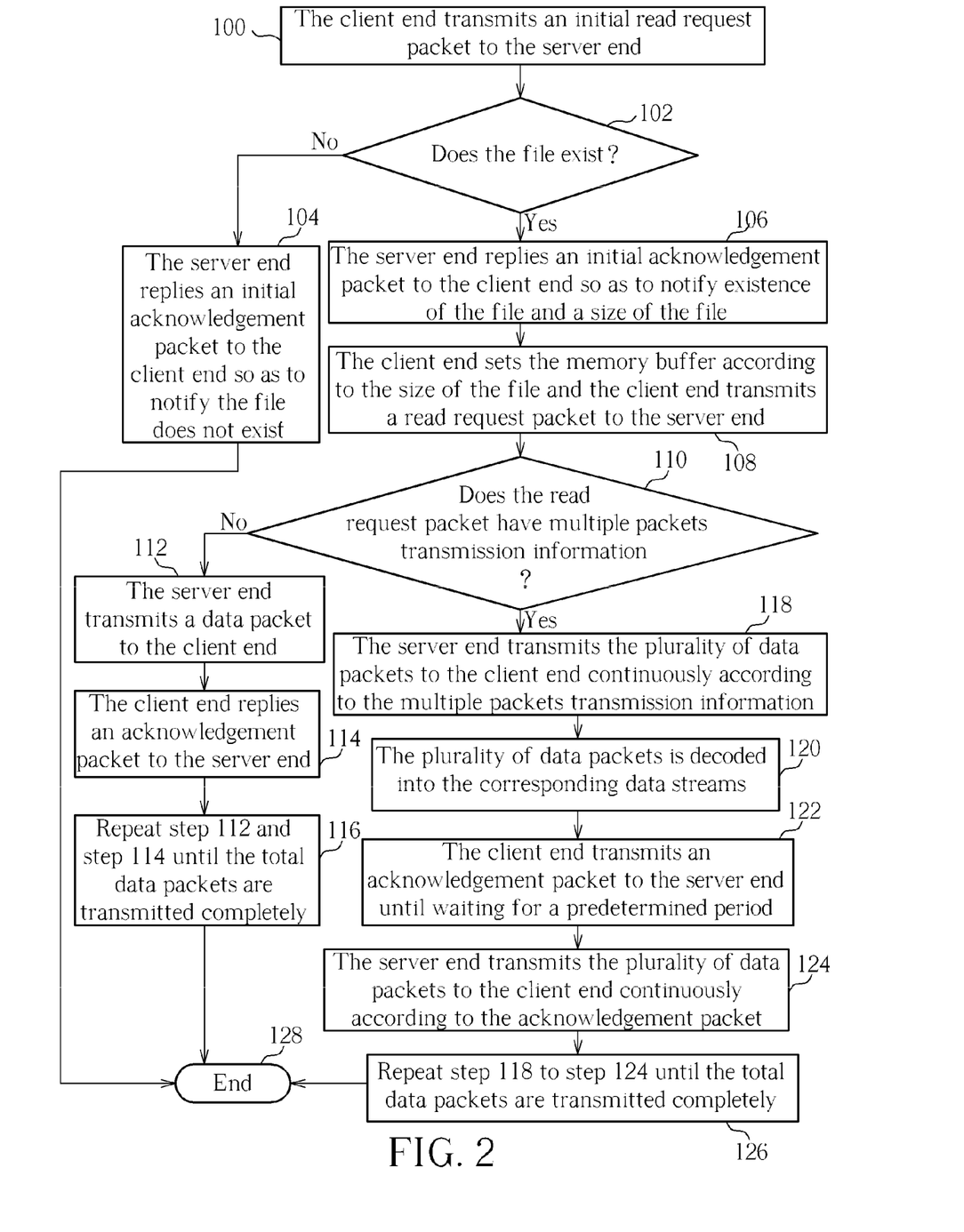
FIG. 2 is a flow chart of transferring the file via the network by the file transmission system according to the preferred embodiment of the present invention.

Please refer to FIG. 2. FIG. 2 is a flow chart of transferring the file via the network by the file transmission system 50 according to the preferred embodiment of the present invention. The method of transferring the file via the network includes following steps:

Step 100: The first network transmission unit 54 of the client 52 transmits an initial read request packet to the second network transmission unit 64 of the server 62 so as to request the server 62 to transmit the file to the client 52;

Step 102: When the second network transmission unit 64 of the server 62 receives the initial read request packet, the second control unit 68 of the server 62 checks whether the file exists. If not, execute step 104. If yes, execute step 106;

Step 104: The second control unit 68 of the server 62 controls the second network transmission unit 64 to reply an initial acknowledgement packet to the first network transmission unit 54 of the client 52 so as to notify the client 52 that the file does not exist;

Step 106: The second control unit 68 controls the second network transmission unit 64 to reply an initial acknowledgement packet to the first network transmission unit 54 of the client 52 so as to notify the client 52 of existence of the file and a size of the file;

Step 108: The first control unit 58 of the client 52 sets the memory buffer 56 according to the size of the file and controls the first network transmission unit 54 to transmit a read request packet to the second network transmission unit 64 of the server 62;

Step 110: The second control unit 68 of the server 62 checks whether the read request packet has multiple-packets-transmission information. If not, execute step 112. If yes, execute step 118;

Step 112: The second control unit 68 controls the second network transmission unit 64 to transmit a data packet corresponding to the file to the first network transmission unit 54 of the client 52 according to the read request packet received by the second network transmission unit 64;

Step 114: After the first network transmission unit 54 of the client 52 receives the data packet transmitted from the second network transmission unit 64, the first network transmission unit 54 replies an acknowledgement packet to the second control unit 68 of the server 62;

Step 116: Repeat step 112 and step 114 until the server 62 finishes transmitting the total data packets corresponding to the file to the client 52 completely;

Step 118: The second control unit 68 controls the second network transmission unit 64 to transmit the plurality of data packets corresponding to the file to the first network transmission unit 54 of the client 52 continuously according to the multiple-packets-transmission information of the read request packet received by the second network transmission unit 64, and stores the plurality of data packets in the memory buffer 56. The first network transmission unit 54 receives the plurality of data packets from the second network transmission unit 64 without replying any acknowledgement packet to the second network transmission unit 64 within the continuous transmission of the plurality of data packets;

Step 120: The first control unit 58 of the client 52 decodes the plurality of data packets stored in the memory buffer 56 into the corresponding data streams and stores the data streams in the first memory unit 60;

Step 122: The first network transmission unit 54 of the client 52 transmits a acknowledgement packet to the second network transmission unit 64 of the server 62 later than a predetermined period, so as to acknowledge whether the plurality of data packets is transmitted correctly and to provide amount information of the data packets of next transmission from the server 62;

Step 124: When the second network transmission unit 64 of the server 62 receives the acknowledgement packet, the second control unit 68 controls the second network transmission unit 64 to transmit a corresponding amount of the plurality of data packets to the first network transmission unit 54 of the client 52 continuously according to the amount information of the data packets of next transmission from the server 62;

Step 126: Repeat step 118 to step 124 until the server 62 finishes transmitting the total data packets corresponding to the file to the client 52 completely;

Step 128: End.

Detailed description of above-mentioned method is introduced as follows. First, the first network transmission unit 54 of the client 52 transmits an initial read request packet, which has information of the requesting file, to the second network transmission unit 64 of the server 62, so as to request the server 62 to transmit the file to the client 52 (step 100). After the second network transmission unit 64 of the server 62 receives the initial read request packet, the second control unit 68 of the server 62 checks whether the file exists (step 102). When the second control unit 68 checks the file does not exist in the server 62, the second control unit 68 of the server 62 controls the second network transmission unit 64 to reply an initial read request packet to the first network transmission unit 54 of the client 52, so as to notify the client 52 that the file does not exist (step 104). The file transmission can not be executed and the procedure is finished. When the second control unit 68 checks the file exists in the server 62, the second control unit 68 controls the second network transmission unit 64 to reply an initial acknowledgement request packet to the first network transmission unit 54 of the client 52 so as to notify the client 52 of the existence of the file and the size of the file (step 106).

Then, the first control unit 58 of the client 52 sets the memory buffer 56 according to the size of the file for storing the data packets received by the first network transmission unit 54 temporarily. The first control unit 58 controls the first network transmission unit 54 to transmit a read request packet to the second network transmission unit 64 of the server 62, so as to request the server 62 to transmit the data packets corresponding to the file (step 108). The file can be a document file, a multimedia file, and so on. The file can be divided into multiple data packets for being transmitted from the server 62 to the client 52 in batches. After the second network transmission unit 64 of the server 62 receives the read request packet, the second control unit 68 of the server 62 checks whether the read request packet has the multiple-packets-transmission information (step 110), so as to acknowledge the next data packets transmission is single data packet transmission in batches or is multiple data packets transmission continuously. As the second control unit 68 checks the read request packet does not have the multiple-data-packets-transmission information, which means the transmission is the single data packet transmission in batches, the second control unit 68 controls the second network transmission unit 64 to transmit the data packet corresponding to the file to the first network transmission unit 54 of the client 52 according to the read request packet received by the second network transmission unit 64 (step 112), which means the server 62 transmits a single data packet to the client 52 in each transmission, and the first network transmission unit 54 of the client 52 replies an acknowledgement packet to the second control unit 68 of the server 62 after receiving the single data packet from the second network transmission unit 64 (step 114) in each transmission, so as to acknowledge whether the data packet is transmitted correctly. In this process, step 112 and step 114 are repeated until the server 62 finishes transmitting the multiple data packets corresponding to the file to the client 52 individually (step 116). That is to say, as there are M data packets which the server transfers to the client, there are M acknowledgement packets which the client replies to the server accordingly.

Figure 3:
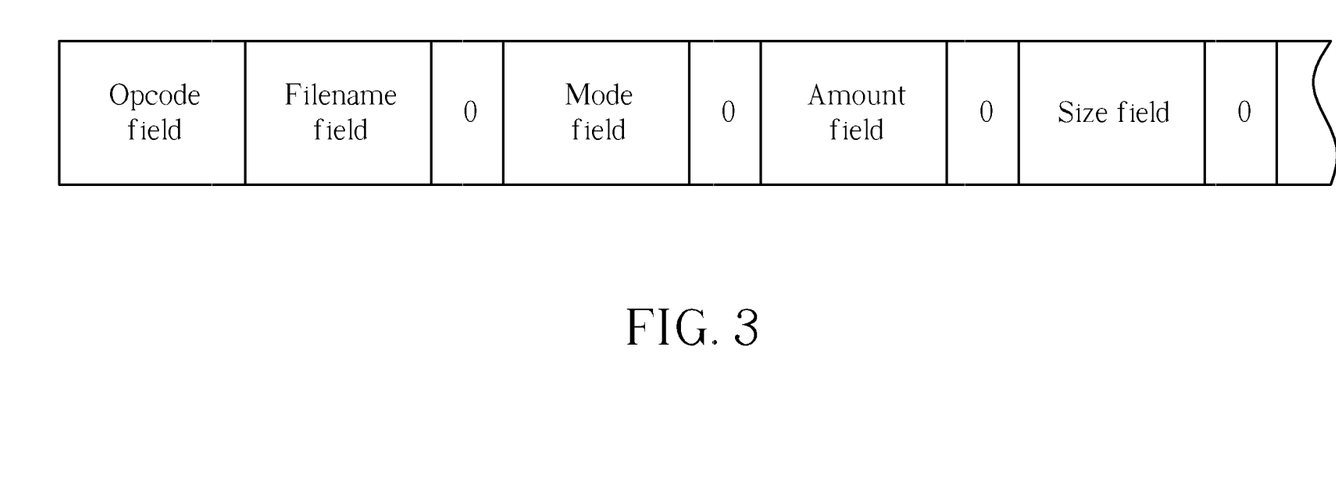
FIG. 3 is a diagram of a read request packet having the multiple-packets-transmission information according to the preferred embodiment of the present invention.

On the Contrary, as the second control unit 68 checks the read request packet having the multiple-packets-transmission information, the transmission is the continuous multiple-data-packets transmission. Please refer to FIG. 3. FIG. 3 is a diagram of the read request packet having the multiple-packets-transmission information according to the preferred embodiment of the present invention. The read request packet can include a plurality of fields, such as fields conforming to TFTP. The read request packet can include an operation code (opcode) field corresponding to requests of writing/reading, a filename field corresponding to the name of the file, a mode field corresponding to the coding mode, and so on. The multiple-packets-transmission information of the read request packet can be set as an index of the other fields. For example, the multiple-packets-transmission information can be set as an amount index of an amount field so as to provide the amount information of the plurality of data packets for next transmission. The multiple-packets-transmission information can further be set as a size index of a size field so as to provide the size information of each data packet for the next transmission. The size of the packet depends on the size information of the file provided by the initial acknowledgement packet. The second control unit 68 controls the second network transmission unit 64 to transmit the plurality of data packets corresponding to the file to the first network transmission unit 54 of the client 52 continuously according to the multiple-packets-transmission information of the read request packet received by the second network transmission unit 64. After the client 52 receives the plurality of data packets, the plurality of data packets is stored in the memory buffer 56. The first network transmission unit 54 of the client 52 receives the plurality of data packets from the second network transmission unit 64 of the server 62 without replying any acknowledgement packet to the second network transmission unit 64 within the continuous transmission of the plurality of data packets (step 118). For example, when the amount index of the multiple data packets is set for transmitting three data packets in each transmission, the second network transmission unit 64 of the server 62 transmits the three data packets to the first network transmission unit 54 of the client 52 continuously. The client 52 receives the data packets without replying any corresponding acknowledgement packet to the server 62 at intervals between a first data packet and a second data packet, and between the second data packet and a third data packet. Thus, the method can decrease an amount of data transmission caused by the acknowledgement packets effectively.

Figure 4:
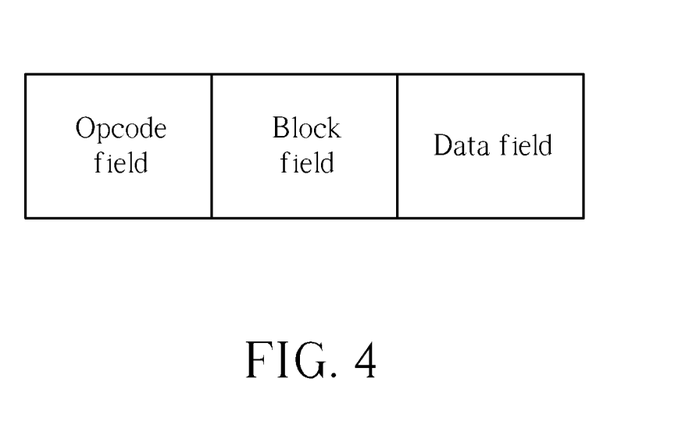
FIG. 4 is a diagram of a data packet according to the preferred embodiment of the present invention.

Afterward, the first control unit 58 of the client 52 decodes the plurality of data packets stored in the memory buffer 56 into the corresponding data streams, and stores the data streams in the first memory unit 60 (step 120). Please refer to FIG. 4. FIG. 4 is a diagram of the data packet according to the preferred embodiment of the present invention. The data packet can include the opcode field corresponding to the request of reading/writing, a block field corresponding to a sequence of the data packets, a data field corresponding to contents of the file, and so on. The data streams can be combined into the file according to an index of the block field. Then, the first network transmission unit 54 of the client 52 transmits a acknowledgement packet to the second network transmission unit 64 of the server 62 later than the predetermined period, so as to check whether the plurality of data packets is transmitted correctly and to provide the amount information of the data packets of next transmission from the server 62 (step 122). Because it takes time to decode the data packets stored in the memory buffer 56, the client 52 receives the plurality of data packets from the server 62 without replying the acknowledgement packet to the server 62 immediately, so as to prevent the client 52 from overloading as the server 62 transmits next data packets to the client 52. The predetermined period that the client 52 pauses is generated according a product of a period for decoding the data streams from the single data packet and the amount of the plurality of data packets, so as to ensure that the client 52 receives next set of the plurality of data packets after this decoding.

Figure 5:
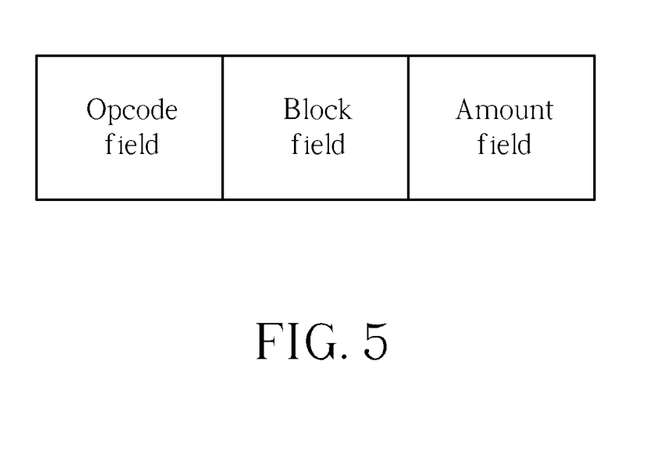
FIG. 5 is a diagram of an acknowledgement packet according to the preferred embodiment of the present invention.

Please refer to FIG. 5. FIG. 5 is a diagram of the acknowledgement packet according to the preferred embodiment of the present invention. The acknowledgement packet can include the opcode field corresponding to the request of reading/writing and the block field corresponding to the sequence of the data packets so as to acknowledge correct transmission of the data packet and to provide the amount information of the plurality of data packets of the next transmission. The acknowledgement packet can provide the amount information of the data packets of the next transmission from the server 62 according to flag values of the data streams decoded from the plurality of data packets, such as providing the amount information of the data packets of the next transmission from the server 62 according to a flag value of the last data stream decoded from the plurality of data packets. For example, as the server 62 transmits three data packets to the client 52 and the last data stream decoded from the three data packets is corresponding to the second data packet, it means the third data packet has not been decoded yet, so that the amount field of the acknowledgement packet can be set as the amount index corresponding to the two data packets. That is to say, the client 52 requests the server 62 to transmit two data packets in the next transmission. Due to a waiting period of decoding the data packets in the client 52, the more data packets have been decoded in the client 52, the more data packets can be transmitted from the server 62 to the client 52 in the next transmission. The method of determining the amount of the data packets of the next transmission from the server 62 is not limited to the above-mentioned embodiment, which can utilize a method of transmitting the multiple data packets with predetermined amounts, and depends on design demand. After second network transmission unit 64 of the server 62 receives the acknowledgement packet, the second control unit 68 controls the second network transmission unit 64 to transmit the plurality of data packets with the corresponding amount to the first network transmission unit 54 of the client 52 according to the amount information of the data packets of the next transmission from the server 62 provided by the acknowledgement packet (step 124). Step 118 to step 124 are repeated in this procedure until the server 62 transmits the multiple data packets corresponding to the file to the client 52 in batches completely (step 126). The client 52 replies the acknowledgement packet corresponding to the plurality of data packets to the server 62 after the server 62 transmits the plurality of data packets to the client 52 completely, which is different from step 112 and step 114. Therefore, the above-mentioned steps can decrease the amount of the transmission of the acknowledgement packets, so that the method for transferring the file via the network of the present invention can decrease the amount of the data transmission due to the transmission of the acknowledgement packets effectively and can be helpful to transmit the file with a large size, such as the multimedia file.

Comparing to the prior art, the client receives the plurality of data packets from the server without replying any acknowledgement packet to the server continuously, so that the method for transferring the file via the network and the related file transmission system of the present invention can decrease the amount of the acknowledgement packets, so as to effectively decrease the amount of the data transmission due to the transmission of the acknowledgement packets. Thus, the present invention provides a network transmission mechanism having excellent transmission efficiency for decreasing the amount of the data transmission.

Those skilled in the art will readily observe that numerous modifications and alterations of the device and method may be made while retaining the teachings of the invention.

What is claimed is:

1. A method of transferring a file via a network comprising:
   transmitting a read request packet from a client to a server, the read request packet having multiple-packets-transmission information, wherein the multiple-packets-transmission information is labelled with an amount index that indicates a number of a plurality of data packets to be transmitted to the client before any acknowledgement packet to acknowledge whether each of the plurality of data packets is transmitted correctly is transmitted from the client to the server; and
   the server retrieving the number of the plurality of data packets to be transmitted to the client, which is indicated by the amount index of the multiple-packets-transmission information of the read request packet, to transmit the plurality of data packets corresponding to the file to the client continuously accordingly before any acknowledgement packet to acknowledge whether each of the plurality of data packets is transmitted correctly is transmitted from the client to the server after the server receives the read request packet;
   wherein the client receives the plurality of data packets from the server without replying any acknowledgement packet for acknowledging whether each of the plurality of data packets is transmitted correctly to the server at an interval between transmissions of any two data packets of the plurality of data packets within the continuous transmission of the plurality of data packets, the multiple-packets-transmission information further comprises a size index that dictates a size of a single data packet so as to provide size information of each data packet to be transmitted to the client, and the server transmits the plurality of data packets with a corresponding space to the client continuously according to the amount index and the size index of the single data packet.

2. The method of claim 1 further comprising:
   transmitting an initial read request packet from the client to the server so as to request the server to transmit the file to the client.

3. The method of claim 2 further comprising:
   replying an initial acknowledgement packet by the server to the client to acknowledge whether the file exists after the server receives the initial read request packet.

4. The method of claim 1 further comprising:
   transmitting an acknowledgement packet including amount information from the client to the server to acknowledge whether the plurality of data packets is transmitted correctly and to provide the amount information of the data packets of next transmission from the server after transmitting the plurality of data packets corresponding to the file from the server to the client continuously.

5. The method of claim 4 further comprising:
   transmitting the acknowledgement packet from the client to the server later than a predetermined period after transmitting the plurality of data packets corresponding to the file from the server to the client continuously.

6. The method of claim 5, wherein the predetermined period is generated according a product of a period for decoding a data stream from a single data packet and the amount of the plurality of data packets.

7. The method of claim 4, wherein transmitting the acknowledgement packet from the client to the server so as to provide the amount information of the data packets of the next transmission from the server comprises providing the amount information of the data packets of next transmission from the server according to flag values of data streams decoded from the plurality of data packets.

8. The method of claim 7, wherein providing the amount information of the data packets of next transmission from the server according to the flag values of the data streams decoded from the plurality of data packets comprises providing the amount information of the data packets of next transmission from the server according to a flag value of the last data stream decoded from the plurality of data packets.

9. The method of claim 4 further comprising:
   transmitting a corresponding amount of the plurality of data packets from the server to the client continuously according to the amount information of the data packets of the next transmission from the server after the server receives the acknowledgement packet.

10. A file transmission system comprising:
    a client comprising:
       a first network transmission unit for transmitting a read request packet and receiving data packets, the read request packet having multiple-packets-transmission information, wherein the multiple-packets-transmission information is labeled with an amount index that indicates a number of a plurality of data packets to be transmitted to the client before any acknowledgement packet to acknowledge whether each of the plurality of data packets is transmitted correctly is transmitted from the client;
       a memory buffer for storing the data packets received by the first network transmission unit temporarily;
       a first control unit coupled to the first network transmission unit and the memory buffer for decoding the data packets stored in the memory buffer into corresponding data streams; and
       a first memory unit coupled to the first control unit for storing the data streams decoded by the first control unit; and
    a server for transmitting a file to the client, the server comprising:
       a second network transmission unit for receiving the read request packet transmitted from the first network transmission unit and for transmitting the plurality of data packets to the first network transmission unit;
       a second memory unit for storing the file; and
       a second control unit for retrieving the number of the plurality of data packets to be transmitted to the client, which is indicated by the amount index of the multiple-packets-transmission information of the read request packet, to control the second network transmission unit to transmit the plurality of data packets corresponding to the file to the first network transmission unit continuously accordingly before any acknowledgement packet to acknowledge whether each of the plurality of data packets is transmitted correctly is transmitted from the client to the server; wherein the first network transmission unit receives the plurality of data packets from the second network transmission unit without replying any acknowledgement packet for acknowledging whether each of the plurality of data packets is transmitted correctly to the second network transmission unit at an interval between transmissions of any two data packets of the plurality of data packets from the second network transmission unit to the first network transmission unit within the continuous transmission of the plurality of data packets, the multiple-packets-transmission information further comprises a size index that dictates a size of a single data packet so as to provide size information of each data packet to be transmitted to the client, and the second control unit is for controlling the second network transmission unit to transmit the plurality of data packets with a corresponding space to the client continuously according to the amount index and the size index of the single data packet.

11. The file transmission system of claim 10, wherein the first network transmission unit is further for transmitting an initial read request packet to the second network transmission unit so as to request the server to transmit the file to the client.

12. The file transmission system of claim 11, wherein the second control unit controls the second network transmission unit to reply an initial acknowledgement packet to the first network transmission unit to acknowledge whether the file exists after the second network transmission unit receives the initial read request packet.

13. The file transmission system of claim 10, wherein the first network transmission unit transmits an acknowledgement packet including amount information to the second network transmission unit to acknowledge whether the plurality of data packets is transmitted correctly and to provide the amount information of the data packets of next transmission from the server after the second network transmission unit transmits the plurality of data packets corresponding to the file to the client continuously.

14. The file transmission system of claim 13, wherein the first network transmission unit transmits the acknowledgement packet to the second network transmission unit later than a predetermined period after the second network transmission unit transmits the plurality of data packets corresponding to the file to the client continuously.

15. The file transmission system of claim 14, wherein the predetermined period is generated according a product of a period for decoding the data stream from a single data packet and an amount of the plurality of data packets.

16. The file transmission system of claim 13, wherein the acknowledgement packet provides the amount information of the data packets of the next transmission from the server according to flag values of the data streams decoded from the plurality of data packets.

17. The file transmission system of claim 16, wherein the acknowledgement packet provides the amount information of the data packets of the next transmission from the server according to the flag value of the last data stream decoded from the plurality of data packets.

18. The file transmission system of claim 13, wherein the second control unit controls the second network transmission unit to transmit a corresponding amount of the plurality of data packets to the first network transmission unit continuously according to the amount information of the data packets of the next transmission from the server after the second network transmission unit receives the acknowledgement packet.

* * * * *